US010834219B1

(12) United States Patent
Justin et al.

(10) Patent No.: US 10,834,219 B1
(45) Date of Patent: Nov. 10, 2020

(54) INTELLIGENT DISTRIBUTION OF PUSH NOTIFICATIONS

(71) Applicant: International Business Machines Corporation, Armonk, NY (US)

(72) Inventors: Josephine E. Justin, Doddabanaswadi (IN); Srinivasan Nanduri, West Godavari District (IN); Norton Samuel Augustus Stanley, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/739,972

(22) Filed: Jan. 10, 2020

(51) Int. Cl.
*G06F 15/16* (2006.01)
*H04L 29/08* (2006.01)
*G06N 5/04* (2006.01)

(52) U.S. Cl.
CPC ............... *H04L 67/26* (2013.01); *G06N 5/04* (2013.01); *H04L 67/10* (2013.01); *H04L 67/22* (2013.01); *H04L 67/325* (2013.01)

(58) Field of Classification Search
CPC ......... H04L 67/10; H04L 67/26; H04L 67/22; H04L 67/235; H04L 51/24; H04L 12/1895; G06N 5/04
See application file for complete search history.

(56) References Cited

U.S. PATENT DOCUMENTS 9,402,167 B2 * 7/2016 Barat ................ G06F 15/17312
10,621,622 B1 * 4/2020 Kondal .............. G06Q 30/0269
2014/0149538 A1 * 5/2014 Deeter .................... H04L 51/24 709/217
2014/0195620 A1 * 7/2014 Srinivasan ............. H04L 51/14 709/206
2016/0170991 A1 * 6/2016 Birchall .................. H04L 67/20 707/751
2016/0173631 A1 * 6/2016 McKay ................... H04L 67/02 709/203
2016/0315902 A1 * 10/2016 Silva ....................... H04W 4/21
2016/0366075 A1 * 12/2016 Dong .................... H04L 67/306
2017/0118304 A1 * 4/2017 Ratiu ...................... H04L 67/26
2017/0286826 A1 * 10/2017 Min ..................... G06N 3/0445
2018/0013844 A1 * 1/2018 Foged ..................... H04L 51/24
2018/0077097 A1 * 3/2018 Alfaro ..................... H04L 51/16
2018/0091465 A1 * 3/2018 Faaborg ............ H04W 12/0804
2018/0124195 A1 5/2018 Bell (Continued)

*Primary Examiner* — Jonathan A Bui
(74) *Attorney, Agent, or Firm* — Daniel R. Simek

(57) ABSTRACT

Aspects of the present invention disclose a method, computer program product, and system for providing push notifications to an active device of a user. The method includes one or more processors identifying a push notification for distribution to at least a first user, wherein the first user is associated with at least two computing devices. The method further includes retrieving historical push notification interaction information that includes data of the first user dismissing push notifications on the at least two computing devices and the first user opening push notifications on the at least two computing devices. The method further includes determining a prediction of an active computing device, of the at least two computing devices, for the first user based on the retrieved historical push notification interaction information. The method further includes the push notification to the predicted active computing device of the first user.

14 Claims, 5 Drawing Sheets

100
COMPUTING DEVICE 110
USER INTERFACE 112
APPLICATION 114
COMPUTING DEVICE 120
USER INTERFACE 122
APPLICATION 124
NETWORK 105
COMPUTING DEVICE 130
USER INTERFACE 132
APPLICATION 134
SERVER 140
PUSH NOTIFICATION PROGRAM 200
USER INFORMATION REPOSITORY 142
USER DATA 144

(56) References Cited

U.S. PATENT DOCUMENTS

2018/0167342 A1* 6/2018 Lewis ..................... H04L 51/24
2019/0089797 A1 3/2019 Vyrros
2019/0109918 A1 4/2019 Milanese
2019/0158615 A1 5/2019 Deluca
2019/0253519 A1* 8/2019 Milosevic ............... H04L 67/26
2019/0289124 A1* 9/2019 Yalamanchili .... H04M 1/72569
2020/0089808 A1* 3/2020 Liu .......................... G06N 3/04
2020/0118145 A1* 4/2020 Jain ......................... G06F 17/18

* cited by examiner

300

| Device ID | Application ID | User ID | Token | Creation Time |
|---|---|---|---|---|
| 039280 | 6412ec3a-0b42-4dd6-9bce-5f16d79d4943 | User1 | aksdfhalsdfksadf | 2018-06-23 T15:23:30Z |
| 039281 | 6412ec3a-0b42-4dd6-9bce-5f16d79d4943 | User2 | adskfnamdf | 2018-10-16 T06:34:47Z |
| 039282 | 6412ec3a-0b42-4dd6-9bce-5f16d79d4943 | User1 | dslkfhlasdflasdf | 2018-07-23 T15:23:30Z |

| Message ID | Application ID | Payload | Creation Time |
|---|---|---|---|
| Xfy8id | 6412ec3a-0b42-4dd6-9bce-5f16d79d4943 | {"message": { "alert": "Notification alert message"}, "target" : { "userIds" : ["user1"]}} | 2018-06-23 T15:23:30Z |
| j1COtl4K | 6412ec3a-0b42-4dd6-9bce-5f16d79d4943 | {"message": { "alert": "Message from all Devices/Notification from push.api.rest.test.js ", "url": "www.ibm.com"}, "target" : { "userIds" : ["user1"]}} | 2018-10-16 T06:34:47Z |

| Message ID | Application ID | User ID | Device ID | Created Time | Dispatch Time | Open Time | Open Device ID | Dis-missed Time | Dismissed Device ID |
|---|---|---|---|---|---|---|---|---|---|
| Xfy8id | 6412ec3a-0b42-4dd6-9bce-5f16d79d4943 | User1 | 039280 | 2018-06-23 T15: 23:30Z | 2018-06-23 T15: 23:30Z | 2018-06-23 T125: 23:30Z | 039280 | | |
| Xfy8id | 6412ec3a-0b42-4dd6-9bce-5f16d79d4943 | User1 | 039282 | 2018-6-23 T15: 23:30Z | 2018-6-23 T15: 23:30Z | | | 2018-6-23 T15: 23:30Z | 039282 |
| j1COtl4K | 6412ec3a-0b42-4dd6-9bce-5f16d79d4943 | User1 | 039282 | 2018-6-24 T12: 23:30Z | 2018-6-24 T12: 23:30Z | 2018-6-24 T14: 23:30Z | 039282 | | |

| User ID | Message ID | Dis-missed Device ID | Dis-missed Time | Opened Device ID | Opened Time | Weekend | Weekday | Day of Week | Day of Year |
|---|---|---|---|---|---|---|---|---|---|
| User1 | Xfy8id | 039282 | 2018-06-23 T15: 23:30 Z | 039280 | 2018-06-23 T25: 23:30 Z | 0 | 1 | 2 | 30 |

FIG. 3D

INTELLIGENT DISTRIBUTION OF PUSH NOTIFICATIONS

BACKGROUND OF THE INVENTION

The present invention relates generally to the field of content distribution, and more particularly to distribution of push notifications.

A push notification is Internet-based communication where delivery of information proceeds from a software application server to a client computing device without a specific request from the client computing device. A push notification is a message that is "pushed" from a backend server or application to user interface (e.g., mobile applications, desktop applications, etc.).

Push notifications are mainly divided into two approaches, local notifications and remote notifications. For local notifications, the application schedules the notification with the local device's operating system (OS), or, alternatively, sets as a timer in the application itself if it is able to continuously run in the background. When the event's scheduled time is reached, or the event's programmed condition is met, the message is displayed in the application's user interface. Remote notifications are handled by a remote server. Under this scenario, the client application is registered on the server with a unique key (e.g., a universally unique identifier (UUID)). The server delivers the message against the unique key to deliver the message to the client application via an agreed client/server protocol (e.g., Hypertext Transfer Protocol (HTTP) or Extensible Messaging and Presence Protocol (XMPP)) and the client displays the message received. When the push notification arrives, it can transmit short notifications and messages, set badges on application icons or play alert sounds to attract user's attention.

SUMMARY

Aspects of the present invention disclose a method, computer program product, and system for providing push notifications to an active device of a user. The method includes one or more processors identifying a push notification for distribution to at least a first user, wherein the first user is associated with at least two computing devices. The method further includes one or more processors retrieving historical push notification interaction information that includes data of the first user dismissing push notifications on the at least two computing devices and the first user opening push notifications on the at least two computing devices. The method further includes one or more processors determining a prediction of an active computing device, of the at least two computing devices, for the first user based on the retrieved historical push notification interaction information. The method further includes one or more processors the push notification to the predicted active computing device of the first user.

BRIEF DESCRIPTION OF THE DRAWINGS

FIG. 3A is an example depiction of a table that includes data associated with registered devices of users, in accordance with an embodiment of the present invention.

FIG. 3B is an example depiction of a table that includes data associated with push notifications, in accordance with an embodiment of the present invention.

FIG. 3C is an example depiction of a table that includes data gathered during distribution and processing of a push notification, in accordance with an embodiment of the present invention.

FIG. 3D is an example depiction of a table that includes data associated with a user performing an action a push notification, in accordance with an embodiment of the present invention.

DETAILED DESCRIPTION

Embodiments of the present invention allow for a method to analyze and understand the patterns of device usage of a user to send notifications to the device that the user is actively utilizing. Embodiments of the present invention determine a prediction of an active computing device based on device usage data associated with the user and send a push notification to the predicted active computing device. Further embodiments of the present invention receive user interaction information for the received push notification and generate a corresponding data entry, further refining the prediction process.

Some embodiments of the present invention recognize that it is very common for an application user to use that same application on more than one device. For example, a user can install a messaging application on a smartphone, laptop, tablet, wearable device, etc. Embodiments of the present invention also recognize that push notifications can be sent to all devices that have the application. However, the user will be actively utilizing one device to process the notification. Embodiments of the present invention recognize that sending a push notification to all devices is a duplication of effort and consumes bandwidth resources for the user and the notification system.

Accordingly, embodiments of the present invention operate to ensure delivery of a push notification to a device that the user is currently utilizing, instead of a device the user is not utilizing, or all devices associated with a user. Further, embodiments of the present invention provide advantages of reducing extraneous network bandwidth usage and system computational resources for sending duplicate messages and also on the client-side for receiving and processing duplicate notifications.

Implementation of embodiments of the invention may take a variety of forms, and exemplary implementation details are discussed subsequently with reference to the Figures.

Figure 1:
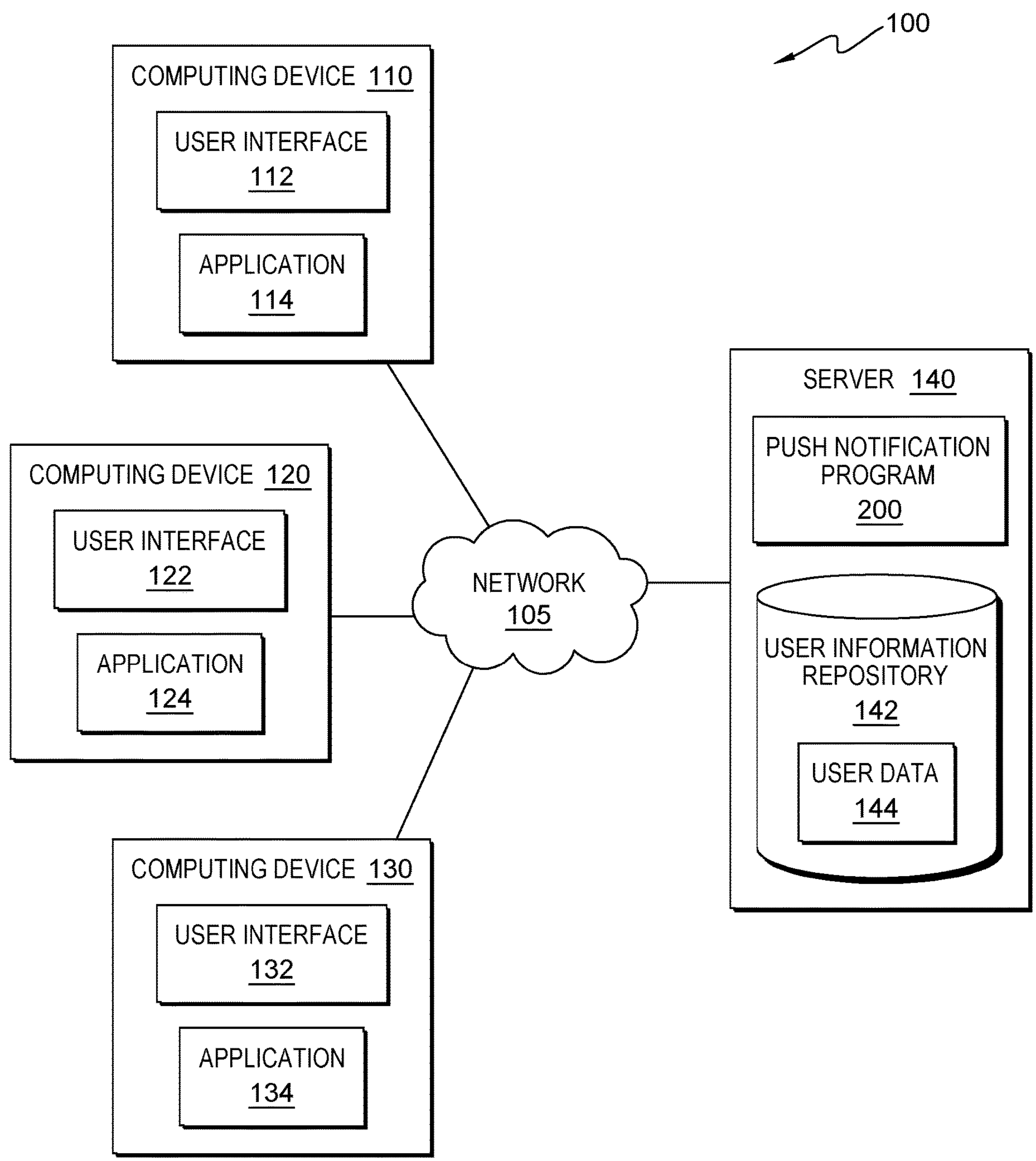
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110, computing device 120, computing device 130, and server 140, all interconnected over network 105. In an example embodiment, computing device 110, computing device 120, and computing device 130 are representative of multiple computing devices that a user utilizes. For example, computing device 110 is a smartphone, computing device 120 is a laptop computer, and computing device 130 is a wearable device, each operated by a common user. In this example embodiment, server 140 provides push notifications to the user, via one or more of computing device 110, computing device 120, and computing device 130, in accordance with embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between computing device 110, computing device 120, computing device 130, and server 140, in accordance with embodiments of the present invention. In various embodiments, network 105 facilitates communication among a plurality of networked computing devices (e.g., computing device 110, computing device 120, computing device 130, and server 140), corresponding users (e.g., an individual computing device 110, computing device 120, and computing device 130), and corresponding management services (e.g., server 140).

In various embodiments of the present invention, computing device 110, computing device 120, and computing device 130 may be a workstation, personal computer, personal digital assistant, mobile phone, or any other device capable of executing computer readable program instructions, in accordance with embodiments of the present invention. In general, computing device 110, computing device 120, and computing device 130 are representative of any electronic device or combination of electronic devices capable of executing computer readable program instructions. Computing device 110, computing device 120, and computing device 130 may include components as depicted and described in further detail with respect to FIG. 4, in accordance with embodiments of the present invention. In an example embodiment, computing device 110 is a smartphone, computing device 120 is a laptop computer, and computing device 130 is a wearable device, each registered to and operated by a common user.

Computing device 110 includes user interface 112 and application 114. User interface 112 is a program that provides an interface between a user of computing device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on computing device 110. In an example embodiment, application 114 is a client-side application of a service or enterprise associated with server 150. In another example embodiment, application 114 is a web browser that an individual utilizing client device 110 utilizes (e.g., via user interface 112) to access and provide information over network 105. For example, a user of computing device 110 provides input to user interface 112 to interact with a received push notification from server 140 (e.g., dismiss a push notification, select a push notification, interact with a push notification, etc.). In other aspects of the present invention, application 114 can be representative of applications that provide additional functionality (e.g., camera, messaging, etc.), in accordance with various aspects of the present invention.

In addition, computing device 120 and computing device 120 include respective instances of user interface 122, application 124, user interface 132, and application 134. The respective instances of user interface 122, application 124, user interface 132, and application 134 include functionality as described above, with regard to respective instances of user interface 112 and application 114. In various embodiments of the present invention, computing device 110, computing device 120, and computing device 130 can receive and process push notifications (received from server 140) utilizing one or more of: operating system (OS) software (not shown) and respective application software (e.g., respective instances of application 114, application 124, and application 134, web browsers, etc.).

In example embodiments, server 140 can be a desktop computer, a computer server, or any other computer systems, known in the art. In certain embodiments, server 140 represents computer systems utilizing clustered computers and components (e.g., database server computers, application server computers, etc.) that act as a single pool of seamless resources when accessed by elements of data processing environment 100 (e.g., computing device 110, computing device 120, and computing device 130). In general, server 140 is representative of any electronic device or combination of electronic devices capable of executing computer readable program instructions. Server 140 may include components as depicted and described in further detail with respect to FIG. 4, in accordance with embodiments of the present invention.

Server 140 includes push notification program 200 and user information repository 142, which includes user data 144. In example embodiments, push notification program 200 provides push notifications to an active device of a user, in accordance with an embodiment of the present invention. In various embodiments, push notification program 200 analyzes the patterns of device usage of a user to send notifications to the device that the user is actively utilizing. Accordingly, push notification program 200 operates to determines a prediction of an active computing device (e.g., an instance of computing device 110, computing device 120, and computing device 130 that a user is currently utilizing) and then send a push notification to determined active computing device. In addition, push notification program 200 receives user interaction information for the received push notification and generate a corresponding data entry, further refining the prediction process.

In example embodiments, server 140 utilizes user information repository 142 to store information associated with registered users of a service or application managed by server 140 and corresponding interactions of the users with push notification distributed by server 140 (e.g., via push notification program 200). User information repository 142 can be implemented with any type of storage device, for example, persistent storage 405, which is capable of storing data that may be accessed and utilized by server 140, computing device 110, computing device 120, and computing device 130, such as a database server, a hard disk drive, or a flash memory. In other embodiments, user information repository 142 can represent multiple storage devices and collections of data within server 140. In various embodiments, user information repository 142 includes information that push notification program 200 can access and utilize, in accordance with embodiments of the present invention. In further embodiments, user information repository 142 includes information associated with user's registered with push notification program 200 (e.g., respective instances of user data 144 for each registered user).

In various embodiments of the present invention, the user of computing device 110, computing device 120, and computing device 130 registers with server 140 (e.g., via a corresponding application). For example, the user completes a registration process, provides information, and authorizes the collection and analysis (i.e., opts-in) of relevant data on at least computing device 110, computing device 120, and computing device 130, by server 140 (e.g., via push notification program 200). In various embodiments, a user can opt-in or opt-out of certain categories of data collection. For example, the user can opt-in to provide all requested information, a subset of requested information, or no information. In one example scenario, the user opts-in to provide time-based information, but opts-out of providing location-based information (on all or a subset of computing device 110, computing device 120, and computing device 130).

In example embodiments, user data 144 is representative of aggregated data, stored within user information repository 142, which is associated with the user of computing device 110, computing device 120, and computing device 130. In various embodiments, user data 144 can include a plurality of information sets associated with a particular user, such as registered computing devices and corresponding information, device identification information, notification preferences and interaction information, time-based interaction information, data usage preferences, and other information relevant to a user receiving push notifications on computing devices. In another example embodiment, user data 144 includes information associated with a user interaction with a push notification, such as information indicating: a notification sent time, a notification read time, notification interaction (e.g., user selection) time, indication of notification dismissal, device status information (e.g., device on or off, device power level, etc.), device ability to receive push notifications (enabled/disabled), etc.

In one embodiment, upon establishing a connection with server 140 via network 105 (e.g., computing device 110 establishing a connection to network 105), a computing device associated with a user can send information (e.g., registration information, usage updates, etc.) to server 140. In this embodiment, the sent information is stored in user information repository 142 associated with the user of the computing device (e.g., aggregating information to user data 144, which is associated with the user of computing device 110). For example, in response to a user opening application 114, computing device sends device identifiers (e.g., device details, data and time stamps, etc.) to server 140, for utilization by push notification program 200 and storage in user information repository 142. In various embodiments of the present invention, server 140 (e.g., utilizing information derived through processing steps of push notification program 200) builds a profile of a user, which server 140 stores in user data 144.

In an example scenario, user data 144 includes information associated with the user of computing device 110, computing device 120, and computing device 130, stored in a long-short-term memory (LSTM) architecture. Some examples of data sets stored in user information repository 142 and user data 144 are depicted in FIG. 3A, FIG. 3B, FIG. 3C, and FIG. 3D. FIG. 3A is an example depiction of table 300, which includes data associated with registered devices of users, in accordance with an embodiment of the present invention. FIG. 3B is an example depiction of table 310, which includes data associated with push notifications, in accordance with an embodiment of the present invention. FIG. 3C is an example depiction of table 320, which includes data gathered during distribution and processing of a push notification, in accordance with an embodiment of the present invention. FIG. 3D is an example depiction of table 330, which includes data associated with a user performing an action (e.g., dismissing) a push notification, in accordance with an embodiment of the present invention.

Figure 2:
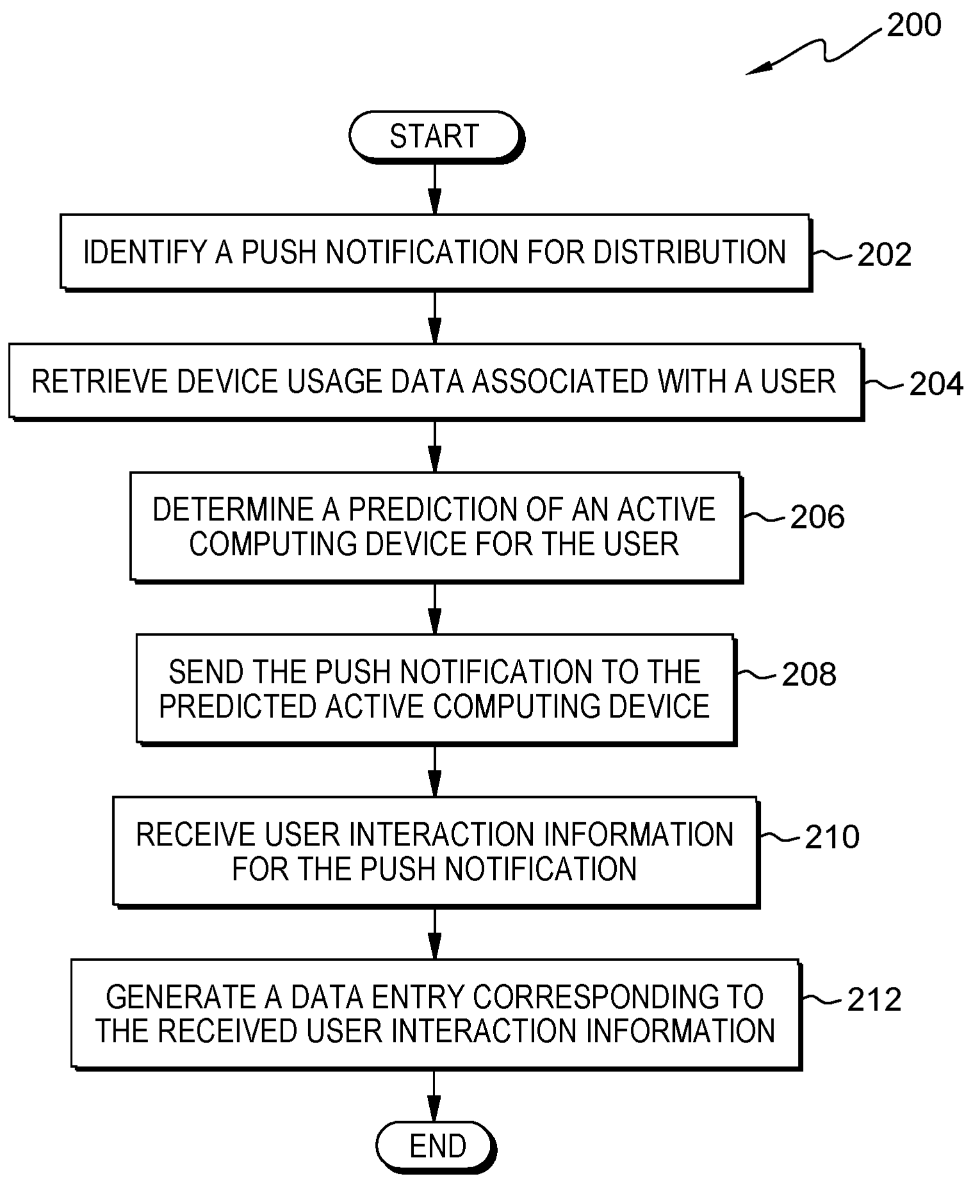
FIG. 2 is a flowchart depicting operational steps of a program for providing push notifications to an active device of a user, in accordance with an embodiment of the present invention.

FIG. 2 is a flowchart depicting operational steps of push notification program 200, a program for providing push notifications to an active device of a user, in accordance with embodiments of the present invention. In one embodiment, push notification program 200 initiates in response to server 140 receiving a push notification that is instructed for distribution (e.g., to a registered user via at least one computing device, to users within a defined location, etc.). In another embodiment, push notification program 200 initiates at a scheduled time to send a push notification. In a further embodiment, push notification program 200 initiates in response to receiving a request to distribute a push notification.

In step 202, push notification program 200 identifies a push notification for distribution. In one embodiment, push notification program 200 identifies a push notification that is instructed for distribution to a user indicated as "User1" (and potentially additional users). In the depicted embodiment, User1 is the user that is associated with computing device 110, computing device 120, and computing device 130.

In an example embodiment, in response to an event occurring, push notification program 200 identifies a push notification for distribution to users (including User1) within a geographic location associated with the event. In another example embodiment, push notification program 200 identifies a push notification that is schedule for distribution to one or more users, including User1.

In step 204, push notification program 200 retrieves device usage data associated with a user. In one embodiment, push notification program 200 retrieves user data 144 from user information repository 142 (i.e., stored data associated with User1). In various embodiments, push notification program 200 retrieves historical usage information (e.g., relevant to interactions with push notifications) of computing devices of a user. For example, push notification program 200 retrieves historical usage information (i.e., in user data 144) for User1 utilizing computing device 110, computing device 120, and computing device 130 to interact with received push notifications. In various embodiments of the present invention, push notification program 200 accesses user information repository 142 and retrieves information that includes one or more of table 300, table 310, table 321, and table 330 (depicted in FIGS. 3A-D).

In step 206, push notification program 200 determines a prediction of an active computing device for the user. In one embodiment, push notification program 200 determines a prediction of which computing device User1 is currently utilizing, based on analyzing device usage data (e.g., user data 144, retrieved in step 204). In various embodiments of the present invention, push notification program 200 predicts which computing device User1 is currently utilizing as the predicted active computing device. In another embodiment, push notification program 200 determines a predication of an active computing device based on determining a probability of which device User1 is most likely to receive and interact with a push notification on at a specified time.

In example embodiments, push notification program 200 analyzes user data 144 to determine a probability that the user (e.g., User1) is currently active on particular device, based on the historical device usage details in user data 144. In one scenario, push notification program 200 analyzes user data 144 to identify which device associated with User1 has the highest push notification conversion rate at the scheduled time (e.g., current or future moment of time) of sending the push notification (of step 202). In this scenario, push notification program 200 can utilize machine learning processes to mine user data 144 and determine a usage pattern of computing device 110, computing device 120, and computing device 130.

For example, push notification program 200 determines push notification conversion patterns for the computing devices of User1. In this example, push notification program 200 determine a pattern indicating that User1 consistently dismisses notifications on computing device 110 (e.g., a smartphone) on weekdays from 9:00 AM until 6:00 PM (e.g., work hours), but reads and interacts with push notifications on computing device 120 (e.g., a laptop) on weekdays after 7:00 PM. Accordingly, for a push notification intended for distribution on Wednesday at 8:00 PM, push notification program 200 determines a prediction of computing device 120 as the active computing device. In an alternate embodiment, for a push notification intended for distribution on Wednesday at 2:00 PM, push notification program 200 determines a prediction of no active computing device (e.g., distribute push notification to all devices associated with User1). In another aspect, push notification program 200 can utilize a probability threshold to determine which computing device is active (e.g., a minimum probability that a user is using a particular device based on the analyzed data).

In the depicted example of FIG. 3A, table 300 includes data associated with registered devices of users, which is organized into columns of Device ID, Application ID, User ID, Token, and Creation Time. In the depicted example of table 300, User1 has registered two devices with server 140, which are represented by device IDs "39280" and "039282." In various embodiments, push notification program 200 analyzes user data 144 to predict which device (from table 300) User1 is the active device.

In step 208, push notification program 200 sends the push notification to the predicted active computing device. In one embodiment, push notification program 200 sends the push notification (identified in step 202) to computing device that User1 is predicted to be active on in step 204. In an example scenario, push notification program 200 determines, based on an analysis of historical usage patterns in user data 144, that at the scheduled distribution time of the push notification, User1 is predicted to be active on computing device 120 (e.g., Wednesday at 8:00 PM). In this scenario, push notification program 200 sends the push notification to computing device 120, and push notification program 200 does not send the push notification to computing device 110 or computing device 130.

In the depicted example of FIG. 3B, table 310 includes data associated with push notifications, which is organized into columns of Message ID, Application ID, Payload, and Creation Time. In various embodiments of the present invention, table 310 includes stored data associated with push notifications that push notification program 200 sends to user devices (e.g., computing device 120 of User1) in step 208.

In another embodiment, push notification program 200 determines a prediction of no active computing device (e.g., based on respective active device probabilities below a threshold value, historical usage data indicating that a user does not interact with a push notification at the indicated distribution time). In this embodiment, push notification program 200 sends the push notification to all devices associated with the user. For example, in response to determining that, based on historical information in user data 144, User1 dismisses push notifications at a distribution time of a push notification (e.g., during work hours on weekdays), push notification program 200 sends the push notification to computing device 110, computing device 120, and computing device 130. In an alternate embodiment, subsequent to sending the push notification, push notification program 200 can end. In another alternate embodiment, push notification program 200 can reinitiate (or initiate) at step 210, in response to receiving information associated with a user interacting with a received push notification.

In step 210, push notification program 200 receives user interaction information for the push notification. In one embodiment, in response to sending the push notification to computing device 120 (in step 208), push notification program 200 receives information associated with User1 interacting with the push notification. For example, push notification program 200 receives information indicating one or more of: whether User1 has interacted with the push notification, the type of interaction (e.g., open, dismiss, etc.), a corresponding time, a device the interaction occurred on, etc.). In an alternate embodiment, push notification program 200 can determine that a user does not interact with the push notification.

In an example scenario, push notification program 200 (in step 208) sends the push notification to computing device 110, computing device 120, and computing device 130. In this example, push notification program 200 can receive information that indicates which device(s) User1 utilizes to interact with the push notification and the type of interaction (e.g., opening the push notification on computing device 120, dismissing the push notification on computing device 110, ignoring the push notification on computing device 130, etc.).

In step 212, push notification program 200 generates a data entry corresponding to the received user interaction information. In one embodiment, push notification program 200 generates a data entry (e.g., in the form of a data entry into LSTM architecture) that includes information describing a user's interaction with a received push notification (received in step 210). In another embodiment, push notification program 200 updates user data 144 (associated with User1) to include the generated data entry.

In the depicted example of FIG. 3C, table 320 includes data gathered during distribution and processing of a push notification, which is organized into columns of Message ID, Application ID, User ID, Created Time, Dispatch Time, Open Time, Dismissed Time, and Dismissed ID, with columns that correspond to message and device interactions (e.g., the second column of table 320 corresponds to device ID “039282” dismissing Message ID “Xfy8id”).

In an example embodiment, push notification program 200 sends a push notification with a message ID of “j1COtI4K” to a computing device with a device ID of “039282” (e.g., computing device 120 of User1) and the user associated with the computing device (i.e., User1) opens the push notification. In this example embodiment, push notification program 200 receives the corresponding user interaction information (in step 210) and generates a data entry by populating the column 321 of table 320 with the interaction information. In alternate example embodiments, push notification program 200 can generate a data entry that includes information indicating that a user has not interacted with a received push notification (e.g., an incomplete data entry).

Embodiments of the present invention can utilize LSTMs in the process of determining a prediction of an active computing device of a user, through utilizing LSTMs to store past information. In the depicted example of FIG. 3D, table 320 includes data associated with a user dismissing a push notification, which is organized into columns of User ID, Message ID, Dismissed Device ID, Dismissed Time, Opened Device IS, Opened Time, Weekend, Weekday, Day of Week, and Day of Year.

In an example embodiment, with respect to FIG. 3D, push notification program 200 receives user interaction information associated with User1 dismissing a received push notification on device ID “039282” (e.g., computing device 120). Accordingly, push notification program 200 generates table 330 to include the received user interaction information associated with message ID “Xfy8id”, which includes information describing the time of dismissal (e.g., indication of time, weekend or weekday, day of week, day of year, etc.). In the depicted scenario, table 330 includes aggregated interaction information for User1 interaction with push notification “Xfy8id”, such as User1 opening on device ID “039282” and dismissing on device ID “039280”. Further, push notification program 200 can utilize information in table 330 (e.g., in combination with table 300, table 310, table 320, and other data entries in user data 144) in the process of determining a prediction of an active computing device for a user (in step 206).

In various embodiments of the present invention, user information repository 142 and user data 144 store data tables in accordance with embodiments of the present invention. FIG. 3A, FIG. 3B, FIG. 3C, and FIG. 3D include exemplary depictions of data tables, which may be a component of user data 144.

FIG. 3A is an example depiction of table 300, which includes data associated with registered devices of users, in accordance with an embodiment of the present invention. FIG. 3B is an example depiction of table 310, which includes data associated with push notifications, in accordance with an embodiment of the present invention. FIG. 3C is an example depiction of table 320, which includes data gathered during distribution and processing of a push notification, in accordance with an embodiment of the present invention. FIG. 3D is an example depiction of table 330, which includes data associated with a user performing an action (e.g., dismissing) a push notification, in accordance with an embodiment of the present invention.

Figure 4:
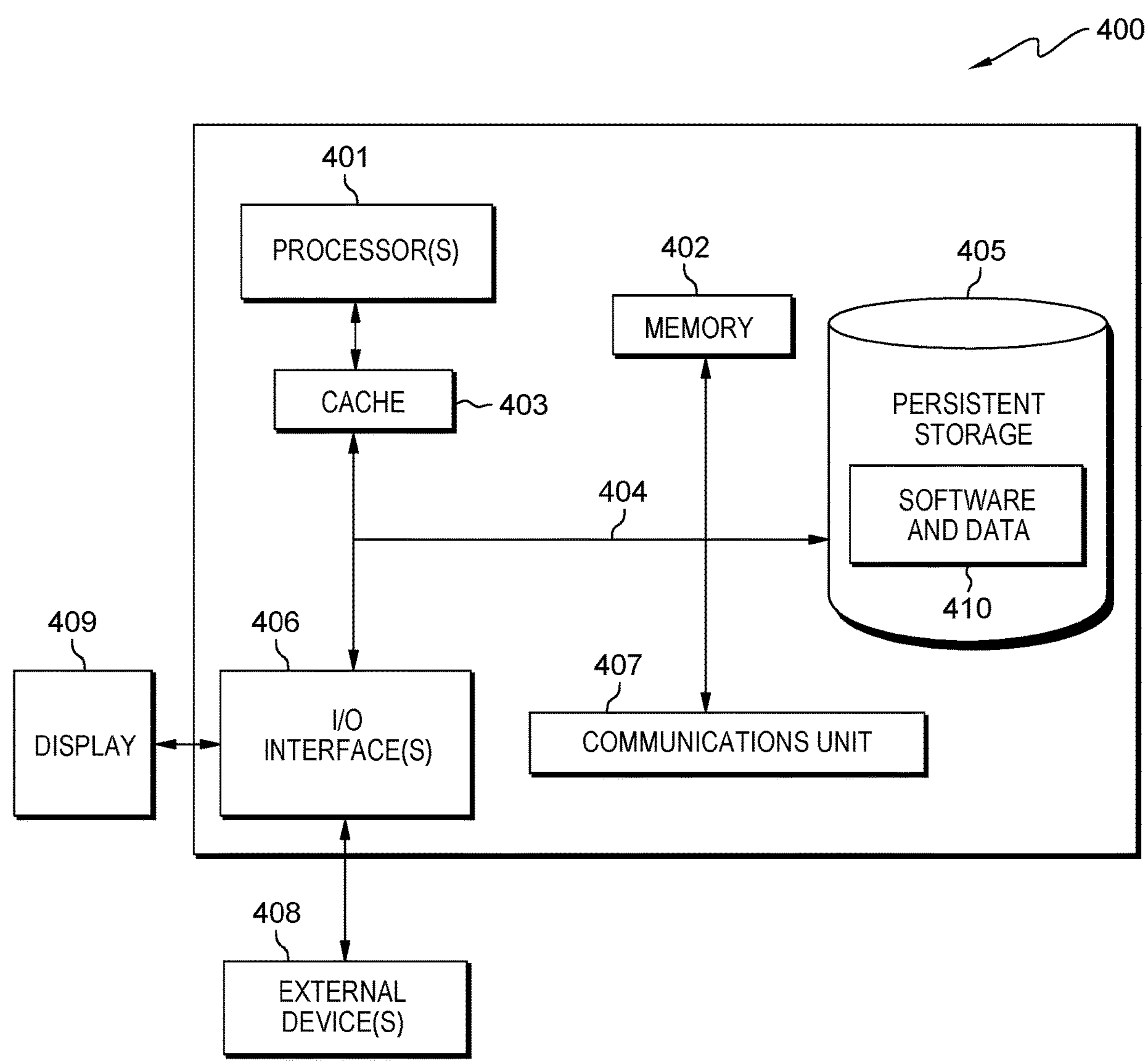
FIG. 4 depicts a block diagram of components of a computing system representative of the client devices and server of FIG. 1, in accordance with an embodiment of the present invention.

FIG. 4 depicts computer system 400, which is representative of computing device 110, computing device 120, computing device 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to computing device 110, software and data 410 includes user interface 112 and application 114. With respect to computing device 120, software and data 410 includes user interface 122 and application 124. With respect to computing device 130, software and data 411 includes user interface 132 and application 124. With respect to server 140, software and data 410 includes push notification program 200, user information repository 142, and user data 144.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

identifying, by one or more processors, a push notification for distribution to at least a first user, wherein the first user is associated with at least two computing devices;

retrieving, by one or more processors, historical push notification interaction information that includes data of the first user dismissing push notifications on the at least two computing devices and the first user opening push notifications on the at least two computing devices;

determining, by one or more processors, a prediction of an active computing device, of the at least two computing devices, for the first user based on the retrieved historical push notification interaction information, wherein determining a prediction of an active computing device, of the at least two computing devices, for the first user further comprises:

determining, by one or more processors, a probability that the first user is actively utilizing each respective instance of the at least two computing devices at a scheduled distribution time of the push notification; and in response to determining that respective probabilities that the first user is actively utilizing each respective instance of the at least two computing devices at a scheduled distribution time of the push notification do not meet a minimum probability threshold, sending, by one or more processors, the push notification to each of the at least two computing devices.

2. The method of claim 1, further comprising:

in response to determining a respective probability that the first user is actively utilizing a first computing device, of the at least two computing devices, at the scheduled distribution time of the push notification, determining, by one or more processors, that the first computing device is the predicted active computing device.

3. The method of claim 1, further comprising:

receiving, by one or more processors, user interaction information of the first user corresponding to the sent push notification; and generating, by one or more processors, a data entry corresponding to the received user interaction information.

4. The method of claim 3, wherein the generated data entry is a data entry in a long short-term memory architecture.

5. The method of claim 4, further comprising:

updating, by one or more processors, the historical push notification interaction information associated with the first user with the generated data entry.

6. A computer program product comprising:

one or more computer readable storage media and program instructions stored on the one or more computer readable storage media, the program instructions comprising:

program instructions to identify a push notification for distribution to at least a first user, wherein the first user is associated with at least two computing devices;

program instructions to retrieve historical push notification interaction information that includes data of the first user dismissing push notifications on the at least two computing devices and the first user opening push notifications on the at least two computing devices;

program instructions to determine a prediction of an active computing device, of the at least two computing devices, for the first user based on the retrieved historical push notification interaction information, wherein the program instructions to determine a prediction of an active computing device, of the at least two computing devices, for the first user further comprise program instructions to:

determine a probability that the first user is actively utilizing each respective instance of the at least two computing devices at a scheduled distribution time of the push notification; and in response to determining that respective probabilities that the first user is actively utilizing each respective instance of the at least two computing devices at a scheduled distribution time of the push notification do not meet a minimum probability threshold, program instructions to send the push notification to each of the at least two computing devices.

7. The computer program product of claim 6, further comprising program instructions, stored on the one or more computer readable storage media, to:

in response to determining a respective probability that the first user is actively utilizing a first computing device, of the at least two computing devices, at the scheduled distribution time of the push notification, determine that the first computing device is the predicted active computing device.

8. The computer program product of claim 6, further comprising program instructions, stored on the one or more computer readable storage media, to:

receive user interaction information of the first user corresponding to the sent push notification; and generate a data entry corresponding to the received user interaction information.

9. The computer program product of claim 8, wherein the generated data entry is a data entry in a long short-term memory architecture.

10. A computer system comprising:

one or more computer processors;

one or more computer readable storage media; and program instructions stored on the computer readable storage media for execution by at least one of the one or more processors, the program instructions comprising:

program instructions to identify a push notification for distribution to at least a first user, wherein the first user is associated with at least two computing devices;

program instructions to retrieve historical push notification interaction information that includes data of the first user dismissing push notifications on the at least two computing devices and the first user opening push notifications on the at least two computing devices;

program instructions to determine a prediction of an active computing device, of the at least two computing devices, for the first user based on the retrieved historical push notification interaction information, wherein the program instructions to determine a prediction of an active computing device, of the at least two computing devices, for the first user further comprise program instructions to:

determine a probability that the first user is actively utilizing each respective instance of the at least two computing devices at a scheduled distribution time of the push notification; and in response to determining that respective probabilities that the first user is actively utilizing each respective instance of the at least two computing devices at a scheduled distribution time of the push notification do not meet a minimum probability threshold, program instructions to send the push notification to each of the at least two computing devices.

11. The computer system of claim 10, further comprising program instructions, stored on the computer readable storage media for execution by at least one of the one or more processors, to:

in response to determining a respective probability that the first user is actively utilizing a first computing device, of the at least two computing devices, at the scheduled distribution time of the push notification, determine that the first computing device is the predicted active computing device.

12. The computer system of claim 10, further comprising program instructions, stored on the computer readable storage media for execution by at least one of the one or more processors, to:

receive user interaction information of the first user corresponding to the sent push notification; and generate a data entry corresponding to the received user interaction information.

13. The computer system of claim 12, wherein the generated data entry is a data entry in a long short-term memory architecture.

14. The computer system of claim 13, further comprising program instructions, stored on the computer readable storage media for execution by at least one of the one or more processors, to:

update the historical push notification interaction information associated with the first user with the generated data entry.

* * * * *